United States Patent [19]

Takeda et al.

[11] 4,043,904
[45] Aug. 23, 1977

[54] WASTE WATER TREATMENT METHOD

[75] Inventors: Tsuneshi Takeda; Yasuyuki Atarashi; Akira Mori, all of Wakayama, Japan

[73] Assignee: Kao Soap Co., Ltd., Tokyo, Japan

[21] Appl. No.: 715,009

[22] Filed: Aug. 17, 1976

[30] Foreign Application Priority Data

Sept. 1, 1975 Japan ............................. 50-105012

[51] Int. Cl.$^2$ ............................................... C02C 5/02
[52] U.S. Cl. ....................................... 210/28; 210/40; 210/52
[58] Field of Search ....................... 210/24, 28, 39, 40, 210/52, 53, 54, 51

[56] References Cited

U.S. PATENT DOCUMENTS

| 3,215,620 | 11/1965 | Dunning et al. .................... 210/24 |
| 3,259,568 | 7/1966 | Jordan et al. ...................... 210/28 |
| 3,274,104 | 9/1966 | Hamilton ............................ 210/39 |
| 3,398,092 | 8/1968 | Fields et al. ....................... 210/24 |
| 3,635,817 | 1/1972 | Zuckerman et al. ................ 210/28 |
| 3,658,697 | 4/1972 | Huether ............................. 210/28 |
| 3,699,039 | 10/1972 | Calmon et al. ..................... 210/28 |

*Primary Examiner*—Wilbur L. Bascomb, Jr.
*Assistant Examiner*—Ivars Cintins
*Attorney, Agent, or Firm*—Blanchard, Flynn, Thiel, Boutell & Tanis

[57] ABSTRACT

A waste water treatment method for treating waste waters containing a surface active agent comprising a condensate obtained by condensing, with formaldehyde, a sulfonated organic compound such as an aromatic compound, a fused benzene ring compound or a hetero compound, in which a flocculation treatment is combined with an active carbon treatment.

3 Claims, No Drawings

WASTE WATER TREATMENT METHOD

BACKGROUND OF THE INVENTION

1. Field of the Invention

The present invention relates to a method for treating waste waters containing a surface active agent comprising a condensate, with formaldehyde, of a sulfonated organic compound such as an aromatic compound, a fused benzene ring compound or a hetero compound. It is a primary object of the present invention to provide a method according to which a surface active agent such as those mentioned above can be effectively removed from waste waters.

2. Description of the Prior Art

Surface active agents comprising a condensate obtained by condensing with formaldehyde a sulfonated organic compound such as an aromatic compound, a fused benzene ring compound or a hetero compound, are widely used in various fields as dispersing agents. The treatment of waste waters containing these surface active agents involves various problems. Since these compounds have a high molecular weight, they are not readily subject to biodegradation. Accordingly, although they are employed in various processes in such a manner that they are recycled and used repeatedly, they are often discharged from the process systems. It is desired that these compounds be removed from the waste water as completely as possible after the waste water is discharged from the process system. From the conventional general understanding of skilled workers, it is considered that substantially all surface active agents such as sodium alkylbenzene sulfonates (ABS), sodium alkyl sulfates and polyoxyethylene nonylphenyl ethers can be removed almost completely by subjecting waste waters containing these surface active agents to an activated carbon (activated charcoal) treatment, because they can be absorbed excellently by an activated carbon. For example, it has long been known that ABS can be effectively removed by the active carbon treatment. However, the above-mentioned sulfonated products, namely, condensates, with formaldehyde, of sulfonated aromatic compounds, fused benzene ring compounds and hetero compounds, can be removed only to a small extent by the active carbon treatment. In view of the fact that these compounds do not easily undergo biodegradation, the ineffectiveness of the active carbon treatment causes a serious problem of disposing of waste waters containing these compounds.

SUMMARY OF THE INVENTION

We have discovered a method according to which these compounds can be removed substantially completely and very effectively from waste waters.

Among the above-mentioned compounds, those having a suitable molecular weight distribution, for example, a formaldehyde condensate of naphthalenesulfonic acid, are used as dispersing agents in large quantities. The viscosity of an aqueous solution of such a compound at a concentration of 10 wt. % is 1.1 to 10 cp, measured at 25° C. We succeeded in removing substantially completely such compound from waste water containing 1 to 1000 ppm of such compound by subjecting the waste water to the combination of a flocculation treatment and an active carbon treatment. The flocculation treatment referred to in the instant specification means a conventional flocculation treatment in which an inorganic flocculating agent such as aluminum sulfate, polyaluminum chloride, slaked lime, iron chloride, and iron sulfate is added to the waste water at a concentration of 50 to 1000 ppm, while maintaining the pH of the waste water at from 6.5 to 8.5. If necessary, a commercially available polymeric flocculating agent such as polyacrylamide, polyacrylic acid and their derivatives is added to the waste water at a concentration of 1 to 10 ppm in combination with the above-mentioned inorganic flocculating agent.

As the methods for combining this flocculation treatment with an active carbon treatment, there can be mentioned, for example, a method in which from 10 to 1000 ppm powdery active carbon is added to the waste water prior to the addition of the above inorganic flocculating agent and a method in which said active carbon treatment is conducted after the flocculation treatment. In both cases, a highly effective removal of the compound can be obtained.

The theoretical background concerning the effective removal of the foregoing compounds by the combination of the flocculation treatment and the active carbon treatment will now be described.

The foregoing compounds have a broad molecular weight distribution and contain large amounts of polycondensates having two or more nuclei. These polynuclear condensates have a large molecular volume and their molecules do not disperse very much into the micropores of active carbon wherein micropores having a size of 70 to 100 A are well developed. Only the mononuclear compounds are absorbed by the activated carbon. The polynuclear condensates which cannot be removed by the active carbon treatment are removed by the flocculation treatment. It has generally been considered that surface active agents can be completely removed from waste waters by the active carbon treatment. According to our experiments, it has been confirmed that surface active agents having a broad molecular weight distribution, such as the above-mentioned polynuclear condensates, cannot effectively be removed from waste waters by the active carbon treatment alone and that they can be removed substantially completely only by combining the active carbon treatment with the flocculation treatment.

EXAMPLE

An aqueous solution containing 10% of a formaldehyde condensate of sodium naphthalene-sulfonate was diluted with water so that the surface active agent concentration thereof was 50 ppm and then it was subjected to the active carbon treatment by adding to separate samples of the solution activated carbon of smaller than 275 mesh (JIS) in the various amounts as set forth in the following Table. The solution was agitated for 1 hour, then filtered and then the concentration of the surface active agent was measured. The temperature of the aqueous solution was 20° C and the viscosity of the solution was 5 cp. The results were as shown in the following Table.

TABLE I

| | Surface Active Agent Concentration (ppm) | Amount Absorbed (g/g) | Amount of Surface Active Agent Removed (%) |
| --- | --- | --- | --- |
| starting waste water | 50 | — | — |

TABLE I-continued

| | Surface Active Agent Concentration (ppm) | Amount Absorbed (g/g) | Amount of Surface Active Agent Removed (%) |
|---|---|---|---|
| after treatment with 50 ppm of active carbon | 42 | 0.16 | 16 |
| after treatment with 100 ppm of active carbon | 41 | 0.09 | 18 |
| after treatment with 200 ppm of active carbon | 39 | 0.06 | 22 |
| after treatment with 400 ppm of active carbon | 36 | 0.04 | 28 |

A waste water containing 300 ppm of the above surface active agent-containing waste water was subjected to a flocculation treatment and then to the active carbon treatment. The results shown in the following Table were obtained.

TABLE II

| | Surface Active Agent Concentration (ppm) | Amount Absorbed (g/g) | Amount of Surface Active Agent Removed (%) |
|---|---|---|---|
| starting waste water | 300 | — | — |
| supernatant water after flocculation treatment | 50 | — | 83 (based on the starting waste water |
| after treatment with 100 ppm of active carbon | 36 | 0.14 | 28 (based on the waste water after flocculation) |
| after treatment with 200 ppm of active carbon | 27 | 0.11 | 46 " |
| after treatment with 400 ppm of acitve carbon | 10 | 0.10 | 80 " |

The flocculating agent used for the flocculation treatment was $Al_2(SO_4)_3.18H_2O$ and the amount of the flocculating agent added was 500 ppm based on the starting waste water. The recovered supernatant liquid was used as the water that was then subjected to the respective active carbon treatments. Active carbon pulverized to a size smaller than 275 mesh (JIS) was added to the supernatant water from the flocculation treatment, and the water was agitated for 1 hour and then filtered. The surface active concentration was measured with respect to the filtrate.

As will be apparent from the results shown in the above Table, the surface active agent can be removed substantially completely by combining the flocculation treatment with the active carbon treatment. The activated carbon treatment removes more surface active agent from the waste water that has previously been subjected to a flocculation treatment, in comparison with the amount of the surface active agent that can be removed when only an activated carbon treatment is performed, even though the amount of surface active agent present in the waste water at the beginning of the activated carbon treatment is the same in both cases. The activated carbon treatment in combination with the flocculation treatment provides an unexpected synergistic improvement in the amount of the surface active agent that is removed.

The above-mentioned surface active agents are known compounds and are disclosed, for example, in U.S. Pat. No. 3,788,868, the entire contents of which are incorporated herein by reference.

The above-mentioned surface active agents generally have molecular weights of 1500–10,000, and have the formula

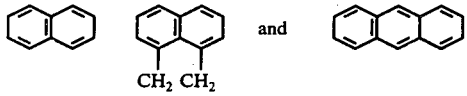

wherein
Ar is benzene or fused polycyclic aromatic benzenoid hydrocarbon having from 2 to 12 benzene rings, such as

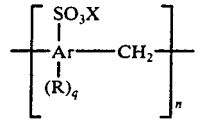

R is hydrogen, methyl or ethyl radical
X is a water-solubilizing cation selected from the group consisting of alkali metals, alkaline earth metals, ammonium and lower amines,
q is 1 or 2, and
n is a number sufficient to provide molecular weight of 1,500–10,000.

The embodiments of the invention in which an exclusive property or privilege is claimed are defined as follows:

1. A process for treating waste water containing from 1 to 1000 ppm of water-soluble salts of condensates obtained by condensing, with formaldehyde, sulfonates of mono or fused polycyclic benzenoid aromatic hydrocarbons having from 1 to 12 benzene rings, which comprises the sequence of steps of: (1) adding to said waste water from 50 to 1000 ppm of at least one inorganic flocculating agent while maintaining the pH of the waste water at from about 6.5 to about 8.5 to form flocs containing a portion of said condensates and removing the resulting flocs from the waste water, and then (2) adding to the treated waste water product from step (1) from 50 to 400 ppm of activated carbon and agitating same therein for a period of time effective to absorb the condensate into the activated carbon and then filtering the activated carbon from the waste water.

2. A process as claimed in claim 1 in which in step (1) there is also added to the waste water from 1 to 10 ppm of a polymeric flocculating agent.

3. A process as claimed in claim 1 in which the condensate is a condensate of sodium naphthalene sulfonate.

* * * * *